(No Model.)
R. PARKER.
COFFEE POT, &c.
No. 558,515. Patented Apr. 21, 1896.
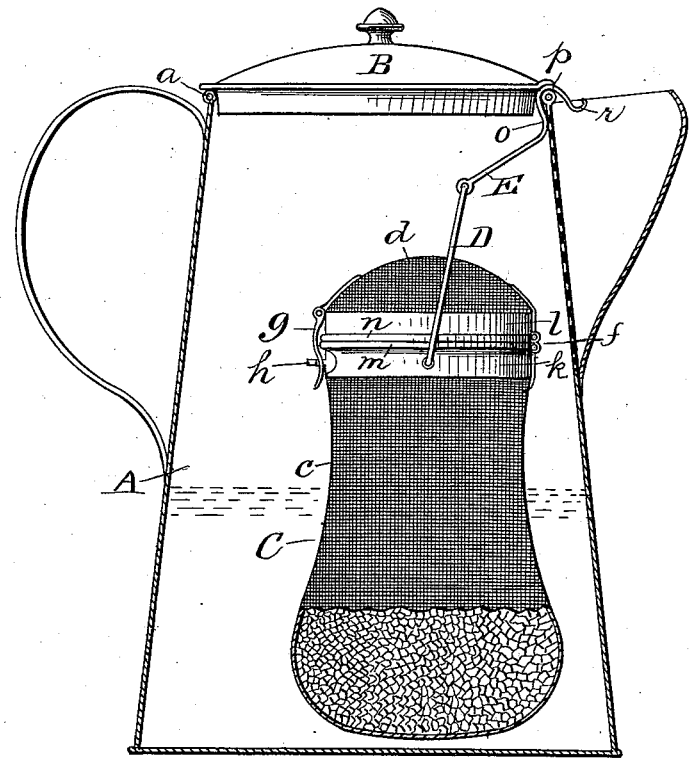
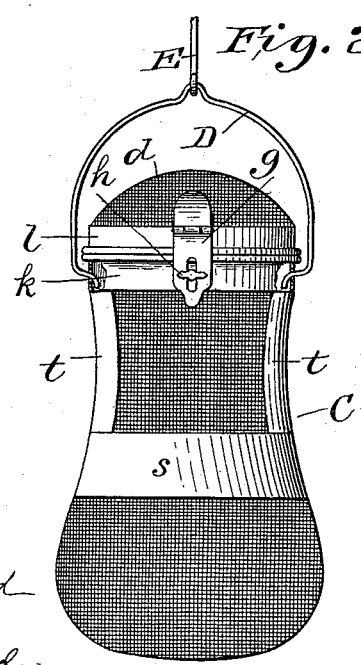
Witnesses
Jos. H. Blackwood
Albert B. Blackwood
Inventor
Robert Parker
per Nathan Bickford
Attorney

UNITED STATES PATENT OFFICE.

ROBERT PARKER, OF PHILADELPHIA, PENNSYLVANIA.

COFFEE-POT, &c.

SPECIFICATION forming part of Letters Patent No. 558,515, dated April 21, 1896.

Application filed November 11, 1895. Serial No. 568,522. (No model.)

*To all whom it may concern:*

Be it known that I, ROBERT PARKER, a citizen of the United States, residing at Philadelphia, in the county of Philadelphia and State of Pennsylvania, have invented certain new and useful Improvements in Coffee, &c., Pots; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved strainer and mode of attachment for use in coffee, &c., pots.

The nature of my invention will be described below, and pointed out in the claims.

In the drawings, Figure 1 is a vertical section, the strainer partly whole and partly broken. Fig. 2 is a detail of the preferred form of strainer.

Like letters refer to like parts.

A represents the body of the pot, and B the lid or cover. To make a tight joint, I prefer to have a beading $a$ at the upper rim of the body of the pot.

C is the strainer or basket, consisting of a lower or main portion $c$, made of fine-mesh wire-gauze, and a lid $d$ of the same material. The portion $c$ has the largest transverse diameter near the oval bottom. That of the central part is much less, after which the walls curve outward, but not to give as large a transverse diameter as near the bottom. The lid $d$ is also made mainly of fine metal gauze, is hinged to portion $c$ at $f$, has opposite a slotted clasp $g$, and a turning key or button $h$ to lock the same. The metal bands $k$ and $l$ of parts $c$ and $d$ have beadings $m$ and $n$ to give a tight joint. D is a bail, its free lower ends passing through and inside band $k$, and to the half-loop at the top is loosely attached an arm or hook E. This extends somewhat obliquely or sharply against the inner wall of the pot, then follows the same upward, curves closely over the beading, and then extends downward and outward in the spout or otherwise one-half an inch or more to afford a convenient handle for inserting or removing the strainer, (see contour at $o, p$, and $r$.)

To make the lower portion $c$ of the strainer stronger and to economize in its construction, I prefer to construct it with the circular band $s$ and the front and rear side bands or strips $t$. These may be made of tin, say, one-half an inch wide. The band $s$ extends entirely around portion $c$, and the bands $t$ extend between bands $s$ and $k$. (See Fig. 2.) By this mode of attachment there is a comparatively tight joint with the lid of the pot, the strainer is firmly held and away from the walls of the pot, and at the same time can be easily inserted or removed. The inward curve of the central portion of the strainer allows free circulation of water between it and the front wall of the pot, even if it should accidentally be forced against it, and the coffee, &c., being usually below the center, is thoroughly leached. The strainer does not touch the bottom of the pot, and requires little space and is adapted to any ordinary pot now in use.

Having described my invention, what I claim, and desire to secure by Letters Patent, is—

1. A strainer for coffee, &c., composed of a lower main portion and a hinged, locking-lid, both made mainly of fine-mesh wire-gauze, the main portion having an oval bottom and curving into a less transverse diameter above, combined with the pot, and means for holding said strainer away from the walls of the pot, substantially as shown and set forth.

2. The combination with the pot, of a strainer composed of a lower, main portion and a hinged, locking, oval lid, both made mainly of fine-mesh wire-gauze, the main portion of the strainer having an oval bottom and curving into a less transverse diameter above, the bail attached to the main portion of the strainer, and the hook extending obliquely from the bail to and against the inner wall of the pot, thence upward and against the same, and curving over and beyond the upper rim thereof to form a handle and rest, as set forth.

3. A leaching-receptacle for coffee &c. composed of a hinged, clasping-lid and a lower, or main portion having an oval bottom and curving into a less transverse diameter above, said lower portion also provided with circular bands $k$ and $s$, and strips $t$ extending between them, combined with the pot, and means, substantially as shown, for attaching and detaching the strainer, as set forth.

In testimony whereof I affix my signature in presence of two witnesses.

ROBERT PARKER.

Witnesses:
H. W. CRAGIN,
EDITH HART.